(12) United States Patent
Scott

(10) Patent No.: US 7,028,711 B1
(45) Date of Patent: Apr. 18, 2006

(54) QUICK CONNECTING SAFETY COUPLER

(75) Inventor: Greg F. Scott, Mont Pelier, OH (US)

(73) Assignees: Stephanie C. Essman, Hamilton, IN (US); Coleen D. Essman Bridges, Hamilton, IN (US)

( * ) Notice: Subject to any disclaimer, the term of this patent is extended or adjusted under 35 U.S.C. 154(b) by 0 days.

(21) Appl. No.: 11/191,473

(22) Filed: Jul. 28, 2005

(51) Int. Cl.
F16L 37/28 (2006.01)

(52) U.S. Cl. .................. 137/614.06; 251/149.9

(58) Field of Classification Search ........... 137/614.06; 251/149.9, 149.5
See application file for complete search history.

(56) References Cited

U.S. PATENT DOCUMENTS

| | | | |
|---|---|---|---|
| 3,140,072 A | 7/1964 | Sciuto, Jr. | |
| 3,367,366 A | 2/1968 | Oliveau et al. | |
| 3,404,705 A | 10/1968 | Zopf et al. | |
| 3,423,063 A | 1/1969 | German | |
| RE27,364 E | 5/1972 | German | |
| 3,731,705 A * | 5/1973 | Butler | 137/614.06 |
| 3,791,411 A * | 2/1974 | Bogeskov et al. | 137/614.02 |
| 3,809,122 A | 5/1974 | Berg | |
| 4,181,150 A * | 1/1980 | Maldavs | 137/614.06 |
| 4,222,411 A * | 9/1980 | Herzan et al. | 137/614.04 |
| 4,271,865 A * | 6/1981 | Galloway et al. | 137/614.06 |
| 4,583,711 A | 4/1986 | Johnson | |
| RE34,781 E | 11/1994 | Spalink et al. | |
| 5,603,353 A | 2/1997 | Clark et al. | |
| 5,967,491 A | 10/1999 | Magnuson et al. | |
| 6,029,701 A * | 2/2000 | Chaffardon et al. | 137/614.06 |
| 6,089,539 A | 7/2000 | Kouda | |
| 6,702,254 B1 | 3/2004 | Noble et al. | |
| 6,779,777 B1 | 8/2004 | Kouda | |
| 2002/0134959 A1 | 9/2002 | Noble et al. | |

OTHER PUBLICATIONS

Snap Coupler, Part No. 18295 sold in 1999 by the John Essman Company in Hamilton, IN 46742.

* cited by examiner

*Primary Examiner*—A. Michael Chambers
(74) *Attorney, Agent, or Firm*—Geoffrey A. Mantooth; L. Bruce Terry

(57) ABSTRACT

A fluid coupling for connecting a hose to a port includes an internal body slidably supported in an external body bore of an external body. The internal body includes valve bore. A stem, located in the valve bore, includes first and second stem seals, and a stem bore in fluid communication with a hose fitting and an outer surface of the stem between the seals. The stem is movable between valve open and closed positions by moving a valve handle. A rotation limiting member coupled to the stem and slidably coupled to the external body limits the rotation of the stem. A locking sleeve coupled to the external body moves between a secure position and a release position. The locking sleeve interferes with the valve handle position when the locking sleeve is in the release position to prevent opening the valve when not connected to the port.

8 Claims, 4 Drawing Sheets

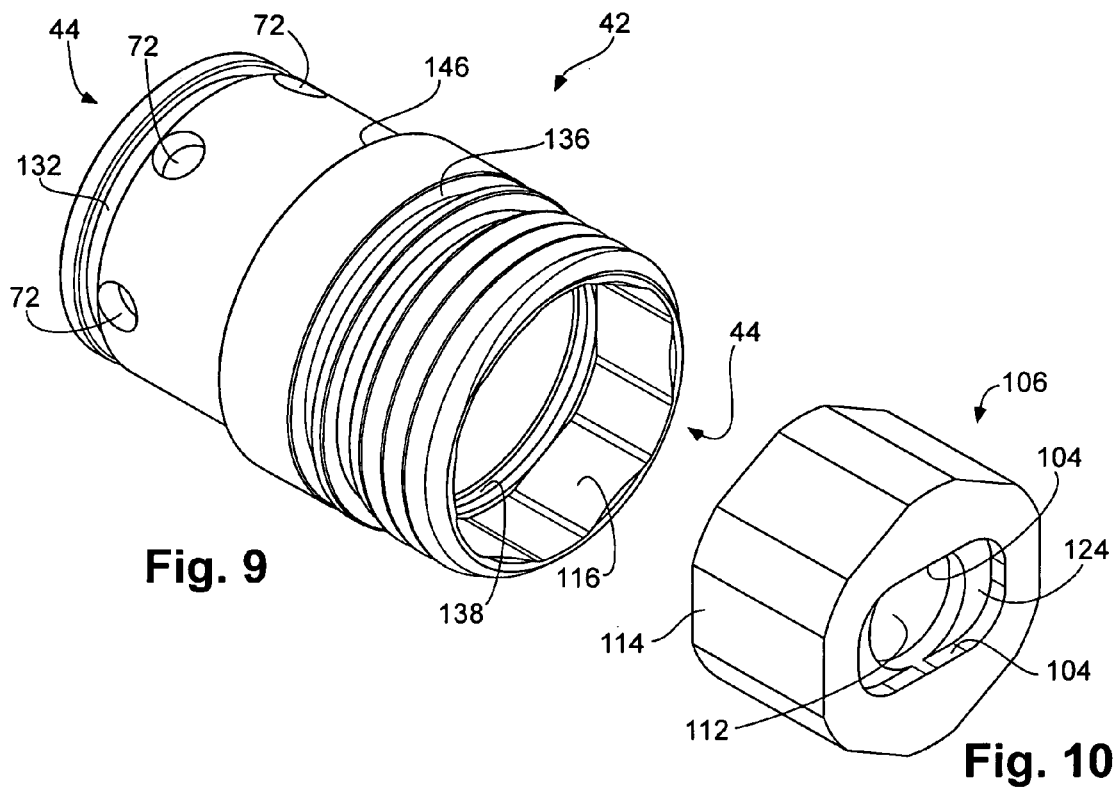
Fig. 9
Fig. 10
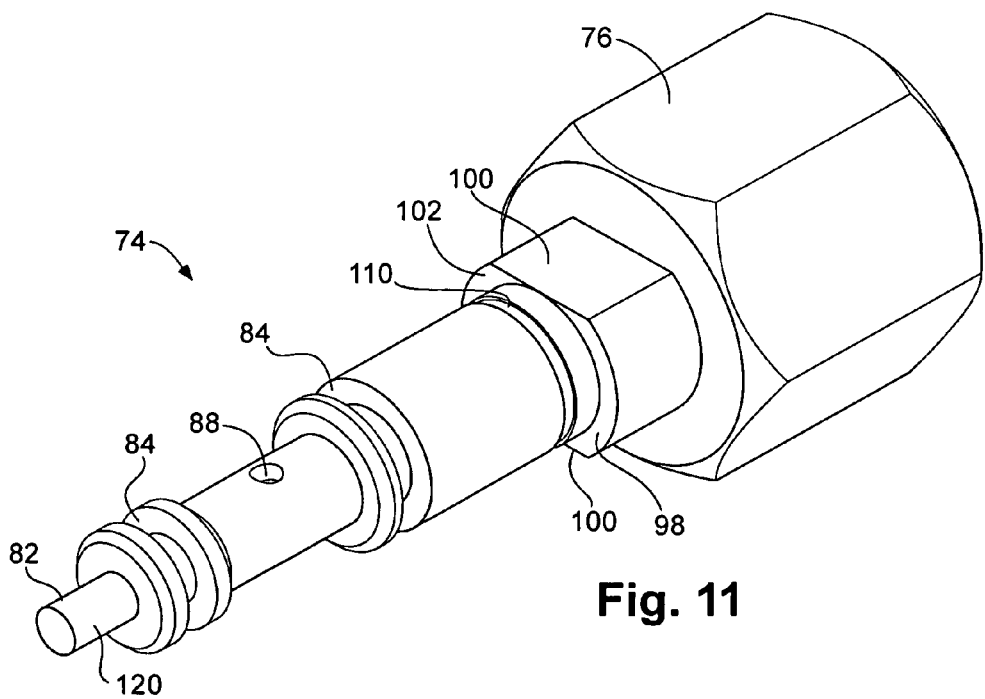
Fig. 11

QUICK CONNECTING SAFETY COUPLER

BACKGROUND OF THE INVENTION

1. Field of the Invention

The present invention relates generally to a fluid coupling for connecting a hose to a service port, and more particularly to a fluid coupling that can be quickly connected and disconnected, and that has a valve that can be opened only when the coupling is securely connected with a service port.

2. Description of the Prior Art

Automotive air conditioning systems frequently have charging ports that allow a person maintaining the system to add or remove refrigerant used by the system. Charging ports may also provide a convenient connection point to make measurements of pressures in the system using a pressure gauge.

A coupling, or coupler, is a device that fits onto a charging port. The coupling is typically connected to one end of a hose. The other end of the hose may be connected to a tank of refrigerant, a pressure gauge, or a manifold.

The coupling may contain a coupling valve that can be opened and closed to control the flow of fluid. When the coupling valve is open, refrigerant may pass through, into or out of the air conditioning system by way of the charging port. In preferred designs, the valve in the coupling port may be operated with one hand, without having to see the coupling to locate the valve handle, or see if the valve is opened or closed. It is also preferred to have a coupling design that permits connecting to the port and operating the valve without a substantial change in the user's grip on the coupling and hose. This allows easy connection and valve operation with one hand, which is an advantage in a location where the user cannot see the port.

The coupling port on the air conditioning system may also have an interior valve. A typical type of valve found in a charging port is a Schroeder valve. The Schroeder valve may be opened and closed by depressing and releasing a valve stem inside the charging port. The Schroeder valve inside the charging port is preferably operated together with the operation of the coupling valve. In some prior art couplings, the Schroeder valve is operated as part of the attachment process. This has the disadvantage of opening the Schroeder valve too soon, before the coupling is completely attached, which means that the force needed to attach the coupling increases due to the pressure of the fluid in the charging port. The charging port may also have an exterior circumferential groove that permits the use of a quick connect/disconnect mechanism that engages the groove.

When the coupling is connected and disconnected with the charging port, it is desirable to minimize refrigerant leakage due to the cost of wasted refrigerant and concerns about the refrigerant damaging the environment. Refrigerant leakage is minimized by installing the coupling onto the charging port with both the coupling valve and the charging port valve in closed positions.

It is also preferred, for safety reasons and for reducing fluid waste, that the coupling securely attach to the port, and remain securely attached until the coupling valve is closed. A coupling that prevents the opening of the coupling valve until it is securely attached to the port is also preferred.

It is also desired for the coupling to be inexpensive to manufacture.

Therefore, there is a need for an improved fluid coupling with an internal coupling valve that is easy to install with a quick connection apparatus, that is easy to operate with one hand, and that includes safety features that prevent the opening of the coupling valve unless the coupling is securely installed on the charging port.

BRIEF SUMMARY OF THE INVENTION

The present invention provides an improved fluid coupling for connecting a hose to a charging port. The coupling includes an internal body slidably supported inside an external body bore of an external body. The internal body includes valve bore. A stem is located in the valve bore, wherein the stem includes first and second stem seals, and a stem bore. The stem bore is in fluid communication with a hose fitting and an outer surface of the stem between the seals. The stem is movable between valve open and closed positions by moving a valve handle. A rotation limiting member coupled to the stem and slidably coupled to the external body limits the rotation of the stem. A locking sleeve coupled to the external body moves between a secure position and a release position. The locking sleeve interferes with the valve handle position when the locking sleeve is in the release position to prevent opening the valve when not connected to the port.

BRIEF DESCRIPTION OF THE DRAWINGS

For a more complete understanding of the present invention, and the advantages thereof, reference is now made to the following descriptions taken in conjunction with the accompanying drawings, in which like numbers designate like parts, and in which:

FIG. 9 is perspective view of an external body of the fluid coupling in accordance with the present invention;

FIG. 10 is perspective view of a rotation limiting collar of the fluid coupling in accordance with the present invention; and FIG. 11 is perspective view of a stem of the fluid coupling in accordance with the present invention.

DESCRIPTION OF THE PREFERRED EMBODIMENTS

Figure 1:
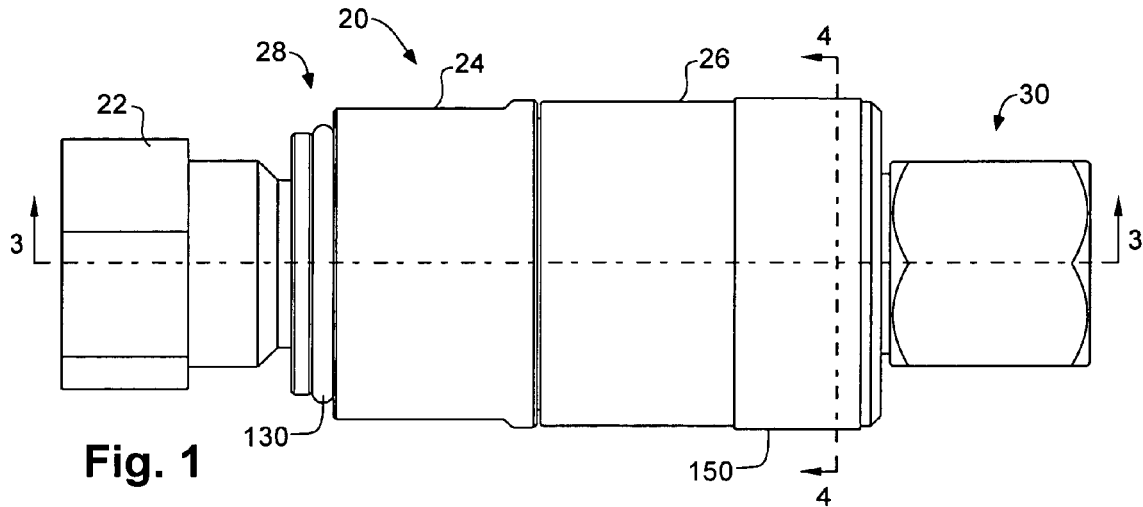
FIG. 1 is a side elevation view of a fluid coupling and a port in accordance with the present invention, shown with the port inserted, but not locked into the fluid coupling, and shown with a locking sleeve in an unlocked position, and with a valve handle in a valve closed position.

With reference now to the drawings, and in particular with reference to FIG. 1, there is depicted fluid coupling 20 being connected to port 22 in accordance with a preferred embodiment of the present invention. Coupling 20 contains an integral coupling valve that can be opened and closed to control the flow of fluid through coupling 20.

In a preferred application of the present invention, coupling 20 is used for transferring a fluid refrigerant (such as chlorofluorocarbons like Freon or R-134a) in to, or out of, an air conditioning system by connecting coupling 20 to port 22, which port may be commonly known as a charging port. Additionally, port 22 may also be used to connect pressure gauges or other test equipment to measure the operating conditions of the air conditioning system.

To keep high pressure refrigerant contained in the air conditioning system when a coupling is not attached, port 22 typically contains a Schroeder valve, which is a common valve that has a spring-loaded center pin that may be depressed and released to control the opening and closing of the valve. When coupling 20 is connected to port 22, opening and closing the valve in coupling 20 also opens and closes the Schroeder valve in port 22. An advantage of the present invention is that operation of the coupling valve and the Schroeder valve are performed after coupling 20 is securely connected to port 22, rather than occurring simultaneously with the attachment motion and force. This means that the force and motion used to press coupling 20 onto port 22 does not need to overcome the force of fluid pressure in the air conditioning system pressing in the opposite direction on coupling 20.

Because coupling 20 of the present invention may be used to transfer fluid under a high pressure, it is important and advantageous that coupling 20 includes a safety feature that prevents the coupling valve from being opened when coupling 20 is not securely attached or locked to port 22. The safety features of the present invention also prevent unlocking or removing coupling 20 from port 22 when the coupling valve is open.

In a preferred embodiment, coupling 20 includes a quick-connect connector design for connecting to port 22, which is actuated by moving locking sleeve 24. Locking sleeve 24 can slide along external body 42 between an unsecure or release position (the position of locking sleeve 24 shown in FIGS. 1 and 3) and a locked or secure position (shown in FIGS. 5–8). In a preferred embodiment, when sleeve 24 is moved to the secure position, steel balls are moved into a cavity in coupling 20 that receives port 22, wherein the balls protrude into an annular ring around port 22, thereby capturing and holding port 22 securely within coupling 20. The quick connect mechanism is described in greater detail below.

Figure 3:
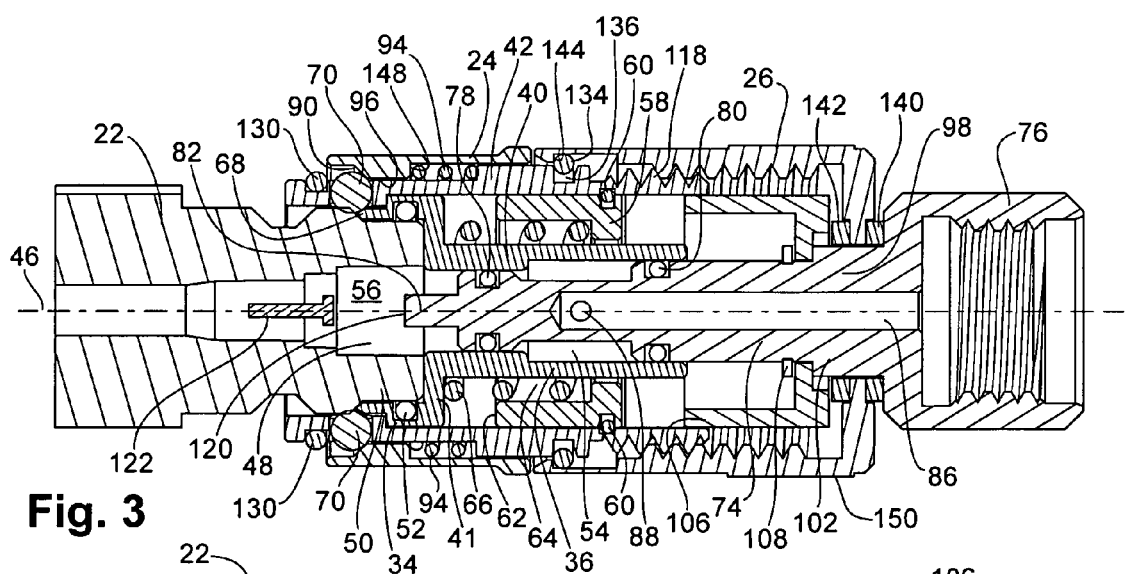
FIG. 3 is sectional view of the fluid coupling and the port as shown in FIG. 1 taken along line 3—3.

In FIGS. 1 and 3, coupling 20 is shown with port 22 starting to enter into coupling 20 and not yet inserted all the way to the locked position, so locking sleeve 24 is shown in the release position. Locking sleeve 24 may be described as being located on a port end 28 of coupling 20, which is an end where port 22 is received. FIGS. 1 and 3 also show valve handle 26 in a position adjacent to locking sleeve 24. Valve handle 26 may be described as being located on a hose end 30 of coupling 20, which is an end where a hose (not shown) may be connected to coupling 20.

To open the coupling valve, valve handle 26 is moved toward the left side of the figure, toward port end 28. But before coupling 20 is secured to port 22, locking sleeve 24 is in a position that interferes with the movement of valve handle 26 toward port end 28. This interference prevents the opening the coupling valve, and prevents high-pressure fluid from escaping from coupling 20, and any attached hose and supply tank connected to coupling 20.

Having a valve located in a coupling at the end of a hose, which is connected to a supply tank, minimizes the amount of fluid that escapes into the environment when the hose is disconnected from the port. A valve at the end of the hose rather than on the supply tank keeps the pressurized fluid in the hose. Upon disconnecting coupling 20, only the amount of fluid between the Schroeder valve and the coupling valve escapes into the environment. Because these two valves are so close together when using the coupling of the present invention, only a small volume of gas escapes.

When port 22 is inserted completely into coupling 20, locking sleeve 24 may be moved toward port end 28, preferably by sliding on external body 42, to the secure position, as shown in FIGS. 5–8. When locking sleeve 24 is in the secure position, valve handle 26 may be moved without interference toward port end 28 to open the coupling valve. Note that opening the coupling valve closes gap 32 (see FIGS. 5 and 6) between locking sleeve 24 and valve handle 26. When the coupling valve is fully opened, and valve handle 26 is in a valve open position, and gap 32 is small, valve handle 26 prevents locking sleeve 24 from moving toward hose end 30, which prevents the premature removal of coupling 20 from port 22 while the coupling valve is open (see FIGS. 7 and 8).

Figure 4:
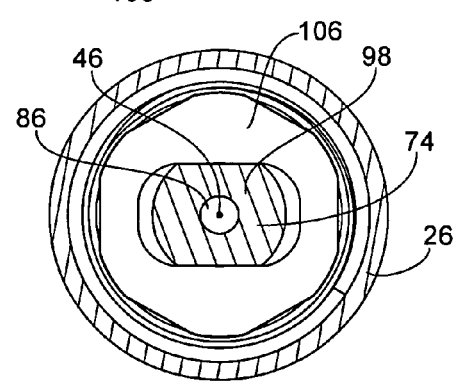
FIG. 4 is sectional view of the fluid coupling shown FIG. 1 taken along line 4—4.
Figure 5:
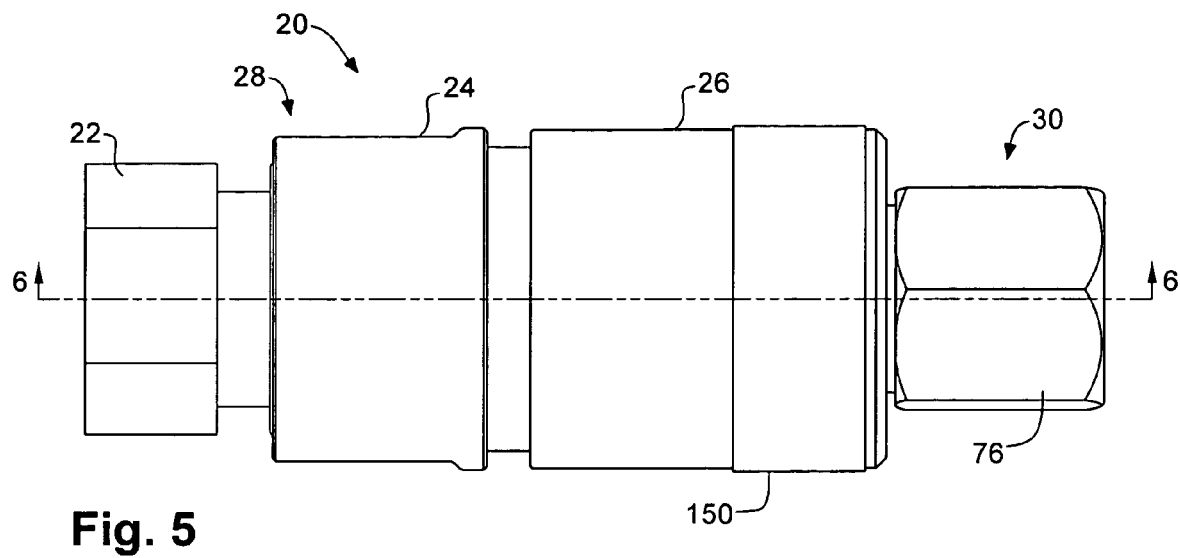
FIG. 5 is a side elevation view of the fluid coupling and port in accordance with the present invention, shown with the port locked into the fluid coupling, and shown with the locking sleeve in a locked position, and with the valve handle in a valve closed position.
Figure 6:
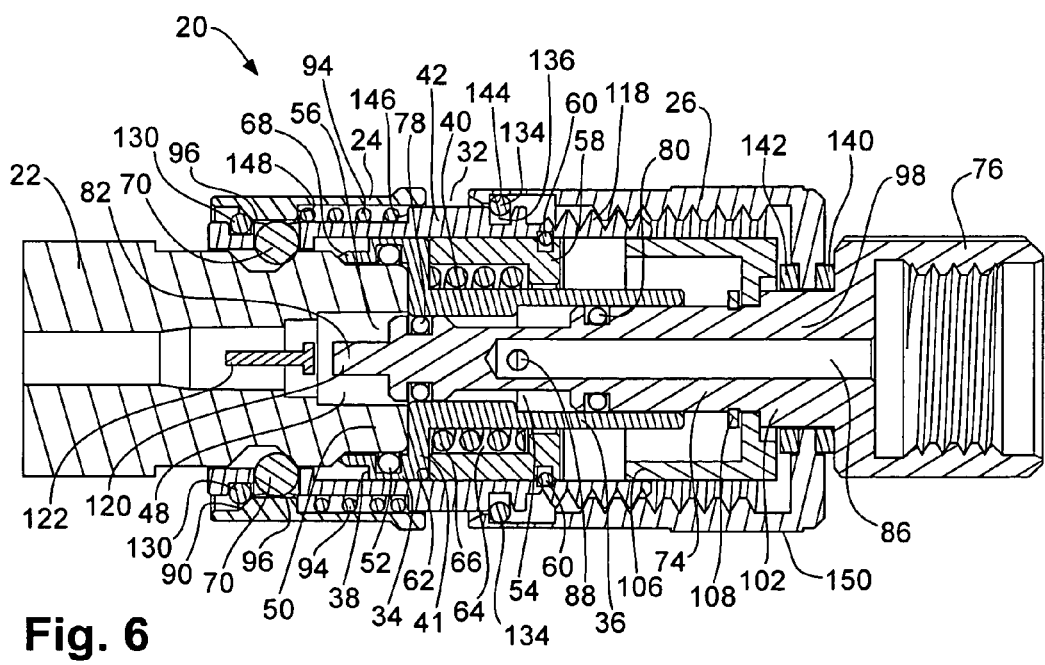
FIG. 6 is sectional view of the fluid coupling as shown in FIG. 5 taken along line 6—6.
Figure 7:
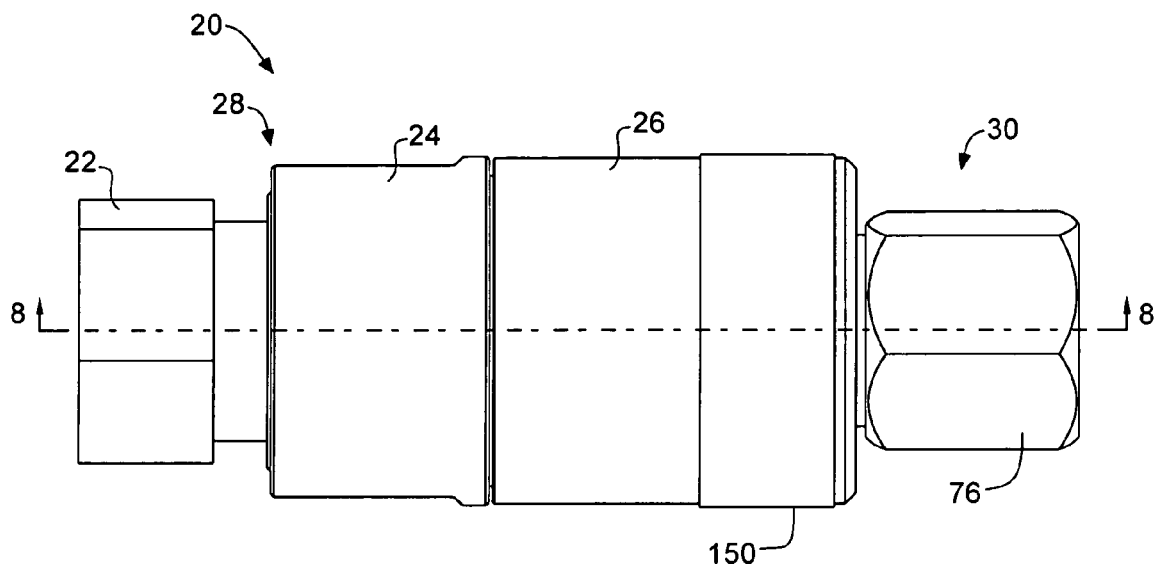
FIG. 7 is a side elevation view of the fluid coupling and port in accordance with the present invention, shown with the port locked into the fluid coupling, and shown with the locking sleeve in a locked position, and with the valve handle in a valve open position.
Figure 8:
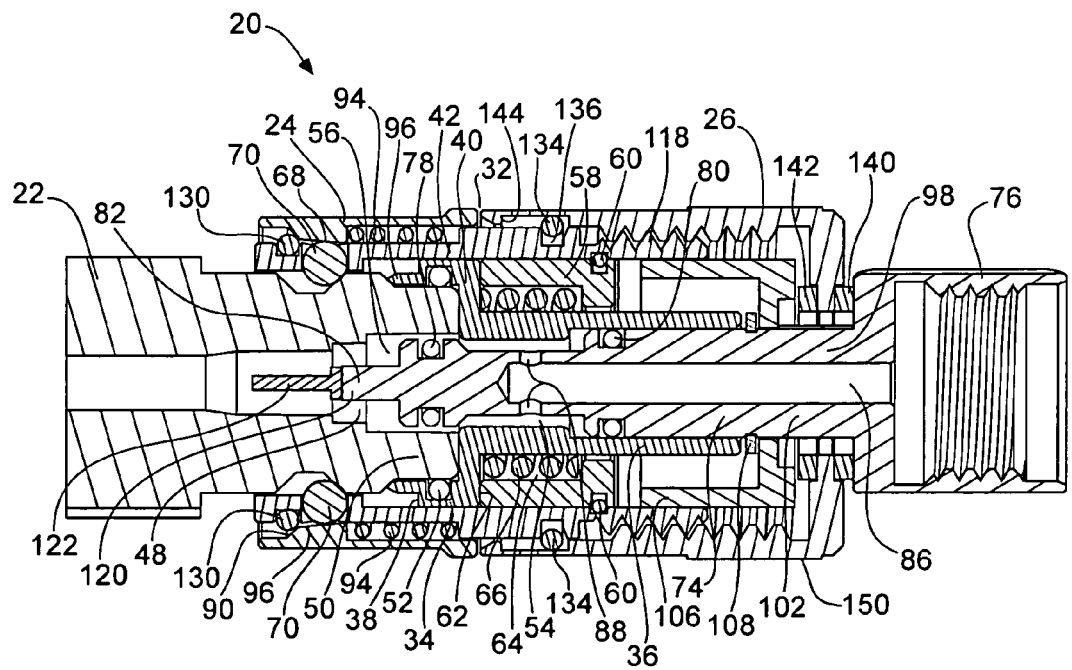
FIG. 8 is sectional view of the fluid coupling as shown in FIG. 7 taken along line 8—8.

With reference now to the section views of FIGS. 3, 6, and 8, coupling 20 includes internal body 40, which is slidably supported within external body 42. Internal body 40 can slide between a first position, which is shown in FIG. 3 nearer port end 28, and a second position, which is shown in FIGS. 6 and 8 nearer hose end 30. As shown in more detail in FIG. 9, external body 42 is generally cylindrical and tubularly shaped, with external body bore 44 extending through it along a longitudinal coupling axis 46, which axis is shown in FIGS. 3 and 4.

As shown in FIGS. 3, 6, and 8, internal body 40 generally includes a first cylindrical portion 34 and a second cylindrical portion 36, which are joined by shoulder 41.

Figure 2:
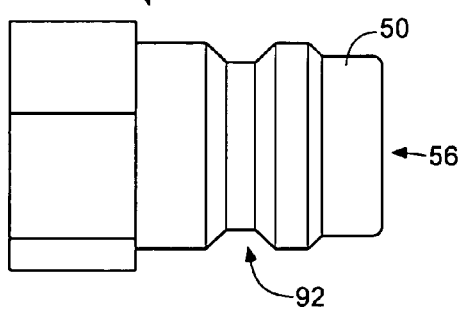
FIG. 2 is a side elevation view of the port shown in FIG. 1.

At port end 28 of coupling 20, external body 42 and first cylindrical portion 34 of internal body 40 form a port cavity 48 for receiving and providing a fluid-tight seal with port tip 50 (see FIG. 2). O-ring 52, which is located within an O-ring groove in first cylindrical portion 34 within port cavity 48, provides the seal by contacting the circumference of port tip 50 and internal body 40.

Internal body 40 further includes valve bore 54, which is in fluid communication with port cavity 48, and extends through second cylindrical portion 36 of internal body 40 from port cavity 48 to the hose end of internal body 40. When the coupling valve is open, fluid can pass through a portion of valve bore 54 into port cavity 48. Valve bore 54 is preferably aligned with port opening 56 in port tip 50.

Internal body 40 slides along interior surfaces of a portion of external body bore 44. As internal body 40 slides between the first and second positions within external body 44, its movement is limited at the first position by a lip 38 (see FIGS. 6 and 8 on first cylindrical portion 34 of internal body 40) coming in contact with a lip on an interior wall of external body bore 44 near port end 28. Movement is limited at the second position by internal body 40 contacting surfaces of bushing 58, as described below.

Bushing 58 is generally cylindrical, with a large bore from the port end 28 that meets a smaller bore from the hose end 30, wherein the large bore creates a cavity within most of bushing 58. Bushing 58 may be held stationary within external body bore 44 by retaining ring 60, which engages retaining ring grooves in the walls of external body bore 44 and the outer wall of bushing 58. Bushing 58 has a circular port-end surface 62 that serves as a stop for positioning internal body 40 in the second position. Bushing 58 may be easily installed within external body bore 44 by compressing retaining ring 60 into the retaining ring groove on bushing 58 and sliding bushing 58 into place from hose end 30 until retaining ring 60 expands into the retaining ring groove in the wall of external body bore 44.

The cavity within bushing 58 may be referred to as spring cavity 64. Spring cavity 64 is used to contain internal body spring 66, which spring may be implemented with a helical coil spring, a wave spring, or the like. Internal body spring 66 contacts shoulder 41 (see FIGS. 3 and 6) of internal body 40 so as to bias internal body 40 toward the first position, nearer port end 28 of coupling 20, which means that spring 66 is compressed when internal body 42 slides from the first position to the second position, nearer hose end 30. In FIG. 3, internal body 40 is shown in the first position, wherein internal body 40 is held toward the port end 28 of coupling 20 by an expanded internal body spring 66. FIGS. 6 and 8 show internal body 40 in the second position, where internal body 40 is closer to hose end 30 of coupling 20 and internal body spring 66 has been compressed.

When internal body 40 is in the first position, rim 68 on port end 28 of internal body 40 contacts the plurality of balls 70 so that balls 70 are held radially away from port cavity 48, retracted within ball openings 72. Ball openings 72 are formed in a wall of external body 42 and are spaced around the circumference of external body 42, extending radially outward from port cavity 48 (see FIG. 9). In a preferred embodiment, there are six balls 70, and other embodiments may use a different number of balls. Note that when balls 70 are retracted, balls 70 protrude outwardly from ball openings 72 to keep locking sleeve 24 in the release position, as balls 70 contact shoulder 90 of locking sleeve 24 and prevent the sleeve from moving toward port end 28. Thus, locking sleeve 24 is held in the open position by internal body 40. This allows an operator to install coupling 20 onto port 22 with just one hand; a simple push of the coupling onto the port is all that is required.

When port 22 enters port cavity 48, internal body 40 is pushed toward hose end 30 of coupling 20, which allows balls 70 to protrude into annular ring 92 of port 22 (see FIG. 2) as shoulder 90 and spring 94 force balls 70 radially inward. Spring 94 extends between a shoulder on external body 42 and a shoulder within locking sleeve 24. Spring 94 biases and slides locking sleeve 24 toward port end 28. Locking sleeve 24 is shown in FIGS. 6 and 8 in the secure position, wherein balls 70 are held inward, protruding into annular ring 92, by ball locking surface 96, which surface is in the port end 28 of locking sleeve 24. In a preferred embodiment, ball locking surface 96 may be conically sloped inward toward coupling axis 46 from port end 28 to hose end 30. An embodiment with such slope is shown only in FIG. 8. A preferred angle of slope is 15 degrees. This angle makes it easier to retract locking sleeve 24 from the secure position to the released position because the sloped surface takes inward pressure off balls 70 as soon as locking sleeve 24 begins to move to the release position.

Coupling 20 further includes stem 74, which is shown in perspective view in FIG. 11. A portion of stem 74 is located in valve bore 54 of internal body 40, as shown in FIGS. 3, 4, 6, and 8. Together, stem 74 and valve bore 54 form the internal coupling valve, which controls the flow of fluid through coupling 20 as stem 74 moves longitudinally within valve bore 54. Stem 74 is moved by a user operating valve handle 26, preferably by turning valve handle 26 on threads 118 at the hose end 30 of external body 42. The outside surface 150 of valve handle 26 may be knurled to provide for better gripping and turning. Alternatively, valve handle 26 may slide along external body 42 and be secured at either the open or closed position by a detent, latch, or other means for temporarily latching, catching, or holding the position of valve handle 26.

Stem 74 includes hose fitting 76 located at a hose end of stem 74. Hose fitting 76 is used for connecting coupling 20 to a hose (not shown), which is preferably used to carry high-pressure refrigerant. Hose fitting 76 is illustrated with a threaded connection designed to receive a male, threaded, hose-end fitting. Other types of hose fittings may be used.

To provide seals within valve bore 54, stem 74 also includes first and second stem seals 78 and 80, respectively, which are spaced apart along the length of stem 74 between hose fitting 76 and a port end 82 of stem 74. First and second stem seals 78 and 80 are preferably implemented with elastomeric O-rings, which are seated and held in place by radial O-ring grooves 84 (see FIG. 11). First and second stem seals 78 and 80 surround the circumference of stem 74, with first stem seal 78 being nearer port end 82 of stem 74 than second stem seal 80. When the coupling valve is closed, first and second stem seals 78 and 80 contact the walls of valve bore 54 in internal body 40, and make a seal between valve bore 54 and stem 74 (see FIG. 6).

Stem 74 also includes a stem bore 86, which is in fluid communication with hose fitting 76 and extends longitudinally through the body of stem 74 toward port end 28 and terminates in the body of stem 74, preferably between first and second stem seals 78 and 80. Stem 74 also includes one or more openings 88 between first and second stem seals 78 and 80. Opening 88 opens to the outer surface of stem 74 and is in fluid communication with stem bore 86. Note that fluid may pass between hose fitting 76 and valve bore 54 by passing through stem bore 86 and opening 88. Opening 88 may be made by drilling completely through stem 74 and intersecting stem bore 86, in which case there will be two openings 88 on opposite sides of stem 74, as shown in the cross section view of FIG. 8 where stem 74 is shown at a different rotational angle.

The coupling valve within coupling 20 is either open or closed depending upon whether or not first stem seal 78 is in contact with valve bore 54, which, in turn, depends upon the relative positions of internal body 40 and stem 74. In a valve closed position, which is shown in FIGS. 3 and 6, first stem seal 78 makes a seal between stem 74 and valve bore 54. Note that in FIG. 3 internal body 40 is in a first position nearer port end 28, and in FIG. 6 internal body 40 is in the second position nearer hose end 30. In both FIGS. 3 and 6, stem 74 is in a valve closed position, and both first and second stem seals 78 and 80 remain in contact with valve bore 54 and stem 74, forming seals on either side of openings 88. Even as internal body 40 slides between the first and second positions (FIGS. 3 and 6, respectively), the coupling valve remains closed when stem 74 is in the valve closed position because the stem seals, and particularly first stem seal 78, have not lost contact with the walls of valve bore 54.

In FIG. 8, the coupling valve is open and first stem seal 78 is located in port cavity 48 and is no longer making a seal between valve bore 54 and stem 74. In this valve-open configuration shown in FIG. 8, fluid is free to pass from hose fitting 76, through stem bore 86, through opening 88, into valve bore 54, where the fluid may pass along the outer surface of stem 74, around first stem seal 78, into port cavity 48, and through charging port 22. Fluid is also free to pass in the reverse direction, depending upon the relative pressures in charging port 22 and hose fitting 76. The portion of stem 74 between first and second stem seals 78 and 80 has a reduced diameter to allow better fluid flow in valve bore 54. The diameter of stem 74 at first stem seal 78 may be smaller than the diameter of stem 74 at second stem seal 80 to allow better fluid flow, and a larger clearance, between stem 74 and the inside walls of port tip 50. Seal 80 provides a seal with internal body 40 at all positions of the coupling.

Pin 120 is located at the port end 28 of stem 74 for opening and closing Schroeder valve by moving Schroeder valve pin 122 in port 22 as the coupling valve is opened and closed. Pin 120 is preferably centered on the actuating pin 122 of the Schroeder valve, and both pins are preferably centered on coupling axis 46. Note that pin 120 is close to Schroeder valve pin 122 when port 22 is locked into coupling 20, and the Schroeder valve remains closed as long as the coupling valve is closed (see FIG. 6). Pin 120 contacts and moves Schroeder valve pin 122 to an open position when the coupling valve is open (see FIG. 8).

To make it easier to install and operate the internal valve of coupling 20, stem 74 includes a rotation limiting member 98 (shown in detail in FIG. 11) to limit the rotation of stem 74 as the coupling valve is opened and closed by rotating valve handle 26. Rotation limiting member 98 is located between second stem seal 80 and hose fitting 76, where it may be a part of stem 74, or a separate part coupled to stem 74. The purpose of rotation limiting member 98 is to provide surfaces that may be engaged by another part of coupling 20 in order to limit the rotation of stem 74 about coupling axis 46 with respect to external body 42. In a preferred embodiment, rotation limiting member 98 may be implemented with two flattened, non-cylindrical surfaces 100 on an otherwise cylindrical collar 102 surrounding stem 74. This shape may be referred to as a "double-D" shape. Non-cylindrical surfaces 100 engage other surfaces to prevent rotation.

In an alternative embodiment, rotation limiting member 98 may use other shapes, such as a triangular shape, square shape, hexagonal shape, octagonal shape, and so forth. In yet another embodiment, rotation limiting member may be implemented with a pin that protrudes radially from stem 74 to a point where it engages another portion of coupling 20 to prevent the rotation of stem 74 with respect to external body 42. Note that rotation limiting member 98 allows movement of stem 74 along coupling axis 46 in order to open and close the coupling valve. Thus, rotation limiting member 98 may engage another part of coupling 20 in a non-rotational manner while it also engages such part in a sliding manner.

In the preferred embodiment shown in the figures, stem 74 is prevented from rotating with respect to external body 42 by providing stem 74 that non-rotationally engages rotation limiting collar 106, and providing features of external body 42 that non-rotationally engage rotation limiting collar 106. More specifically, non-cylindrical surfaces 100 of rotation limiting member 98 (see FIG. 11) engage non-cylindrical surfaces 104 of rotation limiting collar 106 (see FIG. 10). And similarly, non-cylindrical surfaces 114 around the circumference of rotation limiting collar 106 (see FIG. 10) non-rotationally engage surfaces 116 inside hose end 30 of external body 42 (see FIG. 11). Thus, stem 74 non-rotationally engages external body 42 indirectly, through engaging rotation limiting collar 106.

Rotation limiting collar 106 may be coupled to stem 74 by retaining ring 108 (see FIG. 3), which is seated in retaining ring groove 110 (see FIG. 11). Collar 106 is interposed between retaining ring 108 and rotation limiting member 98. As illustrated in FIG. 10, rotation limiting collar 106 has opening 112, with a portion of opening 112 on port end 28 of collar 106 having a cylindrical shape for receiving a cylindrical portion of stem 74, and with a portion on hose end 30 of opening 112 having a countersunk bore 124 with a non-cylindrical shape for receiving a non-cylindrical portion of rotation limiting member 98.

The surface on the circumference of rotation limiting collar 106 is non-cylindrical, being composed of a plurality of flat surfaces 114 in a shape that conforms or correlates to the opening shape formed by surfaces 116 on the hose-end, inside of external body bore 44. The non-cylindrical surfaces of rotation limiting collar 106 and external body 42 are able to slide on each other, parallel to coupling axis 46, but they will not rotate to any extent with respect to one another about coupling axis 46. This is an advantage because coupling 20, and a hose attached to it, will resist turning when valve handle 26 is rotated to open or close the coupling valve. If the whole coupling 20 turned when a user turns valve handle 26, the coupling valve would not move because valve handle would not turn and move along threads 118 at the hose end of external body 42.

Coupling 20 includes various retaining clips, snap rings, and spring clips, to hold components in a fixed position, or to limit the range of motion of one component with respect to another. For example, retaining ring 60, discussed above, holds bushing 58 in a fixed position within external body bore 44. In retaining ring 108 holds rotation limiting collar 106 on stem 74 in a position where surfaces 104 engage non-cylindrical surface 100 (see FIGS. 10 and 11).

Retaining ring 130 near port end 28 (see FIGS. 1, 3, 6, and 8) provides a limit or a stop for the range of motion of locking sleeve 24. When locking onto port 22, balls 70 enter port cavity 48, locking sleeve 24 automatically moves toward port end 28 by the force of spring 94, and retaining ring 130 stops locking sleeve 24 at the secure position by contacting shoulder 90, as shown in FIGS. 6 and 8. Retaining ring 130 may be placed in retaining ring groove 132 (see FIG. 9) at the port end 28 of external body 42 after locking sleeve 24 is slid onto the exterior of external body 42.

Retaining ring 134, which is located in retaining ring groove 136 near the center of external body 42 (see FIGS. 3, 6, and 8), provides a limit or stop for valve handle 26 at the valve-open position. Retaining ring groove 136 is also shown in FIG. 9.

Coupling 20 is designed to be easily assembled with a minimal number of parts that are easy and inexpensive to manufacture. During assembly, o-ring 52 is installed into internal body 40 in port cavity 48, internal body spring 66 is placed around the outside of internal body 40, and internal body 40 is slid into external body bore 44 from hose end 30. Next, retaining ring 60 is compressed into a groove around bushing 58, and bushing 58 is slid into external body bore 44 from hose end 30 to a point where retaining ring 60 expands into retaining ring groove 138 (see FIGS. 3 and 9). As bushing 58 goes into external body bore 44, internal body spring 66 is compressed, which biases internal body 40 toward port end 28.

Next, spring 94 may be installed on the outside of external body 42 from port end 28. Then, locking sleeve 24 may be slid onto the outside of external body 42 to a point where spring 94 is compressed and ball openings 72 are exposed. Balls 70 may then be inserted into ball opening 72 and locking sleeve 24 may be released to capture balls 70 in ball openings 72. Retaining ring 130 may be expanded and installed in retaining ring groove 132 in order to prevent locking sleeve 24 from sliding off port end 28 of external body 42.

Stem 74 is prepared for installation by first sliding washer 140 onto stem 74 and onto collar 102 toward hose end 30. Next, valve handle 26 is installed over stem 74 and onto collar 102, with the hose end 30 of the handle first. Thereafter, washer 142 is installed over stem 74 and onto collar 102, where washers 140 and 142 are on either side of a wall at the hose end of valve handle 26, where washers 140 and 142 keep valve handle 26 centered about coupling axis 46 while allowing valve handle 26 to rotate about stem 74.

Next, rotation limiting collar 106 is installed onto stem 74, opening 112 first. Rotation limiting collar 106 must be angularly oriented so that non-cylindrical surfaces 100 matches up with surfaces 104 in opening 112. In order to secure rotation limiting collar 106 on stem 74, retaining ring 108 is installed on stem 74 in retaining ring groove 110. Next, second stem seal 80 is installed in radial groove 84 near hose fitting 76, and first stem seal 78 is installed in radial groove 84 near pin 120.

Before joining the valve handle and stem assembly with the external body 42, retaining ring 134 is installed in retaining ring groove 136. Next, stem 74 is inserted into valve bore 54 and pushed toward port end 28 until threads 118 on external body 42 engage threads on the inside of valve handle 26. Valve handle 26 may be turned clockwise to engage the threads and continue to move the handle toward port end 28. Eventually, valve handle 26 will contact retaining ring 134 and retaining ring 134 will be compressed into retaining ring groove 136 until shoulder 144 on the inside of valve handle 26 passes retaining ring 134 and allows retaining ring 134 to expand into valve handle 26 on the hose end 30 side of shoulder 144. After retaining ring 134 expands into valve handle 26, it acts as a stop to prevent valve handle 26 from being backed off of threads 118 and coming apart from external body 42.

When operating coupling 20, springs are used to bias parts of the coupling in various positions in order to make the connection between coupling 20 and port 22 easy and somewhat automatic. For example, before coupling 20 is installed on port 22, locking sleeve 24 is initially held in the release position against the force of spring 94, which biases locking sleeve 24 toward port end 28. Spring 94 extends between a valve body shoulder 146 (see FIGS. 6 and 9) and a shoulder 148 on locking sleeve 24 (see FIG. 6). Valve handle 26 is initially in the closed position, located nearer hose end 30.

As coupling 20 engages charging port 22 as shown FIG. 1, port 22 enters port cavity 48, and port tip 50 contacts internal body 40. As coupling 20 continues to be forced onto port 22, internal body 40 begins to move from the first position toward the second position, toward hose end 30. Eventually, balls 70 are forced into annular ring 92 under the pressure of shoulder 90, which is biased toward port end 28 by spring 94. When balls 70 move into annular ring 92, locking sleeve 24 automatically moves to the secure position under the force of spring 94, and balls 70 are locked as they contact ball locking surface 96, as shown in FIG. 6.

When locking sleeve 24 has moved toward port end 28, valve handle 26 remains in the closed position until an operator decides to turn valve handle 26 to move it to the open position nearer port end 28 to open the coupling valve and the Schroeder valve in port 22. The coupling valve may be opened at this point because locking sleeve 24 has moved toward port end 28 allowing space (see gap 32 in FIG. 6) for valve handle 26 to move to the open position.

Once coupling 20 has been installed onto port 22 and the valve is opened, it cannot be removed until the valve is closed and valve handle 26 is moved toward hose end 30. When the coupling valve is closed and valve handle 26 is moved to the closed position near hose end 30, coupling 20 may be removed from port 22 by grasping locking sleeve 24 and pulling toward hose end 30. Moving locking sleeve 24 toward hose end 30 allows balls 70 to move radially outward, out of annular ring 92. With balls 70 retracted, internal body spring 66 forces internal body 40 toward port end 28, and the operator may continue to withdraw coupling 20 from port 22.

Thus, the coupling provides a foolproof mechanism for making a fluid coupling between a charging port and a supply hose or meter, wherein the coupling valve must be closed during installation and removal. In the design of the present invention, pressing coupling 20 onto port 22 automatically secures coupling 20, but does not automatically open the coupling valve. Because the valve remains closed, the operator has to overcome only the force of a spring in the coupling, rather than overcoming both the force of a spring and the additional force of the compressed fluid, which would be present as soon as a coupling valve is opened. In the present invention, the coupling valve and Schroeder valve are opened after the coupling is secured to the port.

The coupling according to the present invention has the advantage of having a simpler design that is less expensive and easy to manufacture and assemble. The coupling of the present invention is also easy to use, especially in hidden locations that can only be reached with one hand. One-handed valve operation is made easier by limiting the rotation of the stem with respect to the external body so that the coupling resists turning as the valve handle is turned. The coupling of the present invention also automatically locks when pressed onto a charging port, and the force needed to install the coupling is reduced by not opening the internal valves as the port is installed. The coupling of the present invention also incorporates safety features that prevent the opening of the coupling valve unless the coupling is securely locked to a port.

The foregoing description of a preferred embodiment of the invention has been presented for the purpose of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A fluid coupling for connecting a hose to a port, wherein the coupling has a longitudinal coupling axis, and a port end for connecting to the port, and a hose end for connecting to the hose, the coupling comprising:
   an internal body;
   a port cavity at a port end of the internal body for receiving the port therein;

a valve bore in communication with the port cavity and extending through the internal body to a hose end of the internal body;

an external body;

an external body bore extending through the external body, wherein the internal body is slidably supported in the external body bore and can slide from a first position nearer a port end of the external body bore to a second position nearer a hose end of the external body bore;

a stem located in the valve bore;

a hose fitting located at a hose end of the stem for coupling to the hose;

first and second stem seals spaced apart on the stem and located between a port end of the stem and the hose fitting, wherein the stem seals surround the circumference of the stem, and wherein the first stem seal is nearer the port end of the stem than the second stem seal;

a stem bore in the stem in fluid communication with the hose fitting and with an outer surface of the stem between the first and second stem seals, wherein the stem is movable in the valve bore between a valve closed position, where the first and second stem seals are both in contact with the valve bore and the stem, and a valve open position, where only the second stem seal is in contact with the valve bore, which valve open position allows fluid communication between the hose fitting and the port cavity;

a rotation limiting member coupled to the stem between the second stem seal and the hose fitting, and slidably coupled to the external body, for limiting the rotation of the stem about the coupling axis with respect to the external body;

a locking sleeve coupled to the external body and moveable between a port secured position and a port unsecured position, wherein the port is secured into the port cavity when the locking sleeve is in the port secured position; and a valve handle coupled to the stem and longitudinally moveably coupled the external body for moving the stem between the valve open position and the valve closed position, and wherein the locking sleeve interferes with the valve handle moving to the valve open position when the locking sleeve is in the unsecured position, thereby preventing the valve from being in the valve open position when the locking sleeve is in the unsecured position.

2. The fluid coupling according to claim 1 wherein the port end of the external body comprises a quick-connect locking connector that locks the port into the port cavity when the locking sleeve is moved to the secured position.

3. The fluid coupling according to claim 2 further comprising:

a locking sleeve spring in contact with the locking sleeve for biasing the locking sleeve toward the secured position; and a quick-connect locking member in contact with the locking sleeve, wherein the quick-connect locking member is held in an unlocked position further from the coupling axis by the inner body when the inner body is in the first position, and wherein the quick-connect locking member is moved to a locked position closer to the coupling axis by the inner body moving toward the second position and the locking sleeve moving toward the secured position.

4. The fluid coupling according to claim 1 wherein the fluid coupling further comprises:

a non-cylindrical hose-end cavity in a portion of the external body bore beginning at the hose end;

a non-cylindrical neck on the stem between the second stem seal and the hose fitting; and wherein the rotation limiting member includes a stem collar having inner surfaces that non-rotationally engage the non-cylindrical neck of the stem, and having outer surfaces that slidingly and non-rotationally engage surfaces in the non-cylindrical hose-end cavity, wherein the stem collar restricts the rotation of the stem about the coupling axis with respect to the external body.

5. The fluid coupling according to claim 1 wherein the stem further comprises a pin depressor at the port end of the stem for depressing a center pin in a Schroeder valve to open the Schroeder valve in the port, wherein the depressor pin contacts and moves the center pin and opens the Schroeder valve as the stem moves toward the port end from the hose valve closed position to the hose valve open position.

6. The fluid coupling according to claim 1 wherein the valve handle is longitudinally moveably coupled to the external body by screw threads on the hose end of the external body and inside a cavity of a cylindrically shaped valve handle.

7. The fluid coupling according to claim 1 further comprising an inner body spring in contact with a shoulder of the inner body and a member fixed to the external body, wherein the inner body spring biases the inner body toward the first position.

8. The fluid coupling according to claim 7 wherein the member fixed to the external body further comprises a bushing fixed in the external body bore.

* * * * *